(12) United States Patent
Mizuo et al.

(10) Patent No.: US 7,306,553 B2
(45) Date of Patent: Dec. 11, 2007

(54) BAG-MAKING METHOD

(75) Inventors: Takayuki Mizuo, Yokohama (JP); Teruaki Nakagawa, Yokohama (JP)

(73) Assignee: Hosokawa Yoko Co., Ltd., Tokyo (JP)

( * ) Notice: Subject to any disclaimer, the term of this patent is extended or adjusted under 35 U.S.C. 154(b) by 106 days.

(21) Appl. No.: 10/532,047

(22) PCT Filed: Oct. 29, 2003

(86) PCT No.: PCT/JP03/13877

§ 371 (c)(1),
(2), (4) Date: Apr. 21, 2005

(87) PCT Pub. No.: WO2004/039562

PCT Pub. Date: May 13, 2004

(65) Prior Publication Data

US 2006/0013974 A1  Jan. 19, 2006

Related U.S. Application Data

(60) Provisional application No. 60/479,837, filed on Jun. 20, 2003.

(30) Foreign Application Priority Data

Oct. 29, 2002  (JP) .............................. 2002-314252

(51) Int. Cl.
*B31B 1/84* (2006.01)
(52) U.S. Cl. .................. 493/87; 493/213; 53/133.2; 53/433; 53/434
(58) Field of Classification Search .............. 493/123, 493/213, 87; 53/410, 433, 434, 133.2
See application file for complete search history.

(56) References Cited

U.S. PATENT DOCUMENTS

| | | | | |
|---|---|---|---|---|
| 3,908,522 A | * | 9/1975 | Bender | 493/194 |
| 4,787,511 A | * | 11/1988 | McIver | 206/216 |
| 4,836,691 A | * | 6/1989 | Suzuki et al. | 383/80 |
| 4,912,907 A | * | 4/1990 | Fang et al. | 53/512 |
| 6,045,493 A | * | 4/2000 | Totani | 493/201 |
| 6,745,540 B2 | * | 6/2004 | Hiramoto et al. | 53/133.2 |
| 6,932,134 B2 | * | 8/2005 | Selle et al. | 156/497 |
| 6,958,033 B1 | * | 10/2005 | Malin | 493/102 |

FOREIGN PATENT DOCUMENTS

| | | |
|---|---|---|
| CN | 1201654 A | 12/1998 |
| DE | 197 52 648 C | 3/1999 |
| EP | 0 539 800 A | 5/1993 |
| EP | 1 127 793 A | 8/2001 |
| JP | 61-194638 U | 12/1986 |
| JP | 3-5304 B2 | 1/1991 |
| JP | 4-191033 A | 7/1992 |
| JP | 07 016956 A | 1/1995 |
| JP | 2791387 B2 | 6/1998 |
| JP | 2940987 B2 | 6/1999 |

* cited by examiner

*Primary Examiner*—Thanh K. Truong
*Assistant Examiner*—Gloria R. Weeks
(74) *Attorney, Agent, or Firm*—Sughrue Mion Pllc.

(57) ABSTRACT

To provide a bag-making method ensuring excellent liquid tightness at the melt-bonded part between the mouth member and the bag unit. A bag-making method for producing a bag by melt-bonding and thereby integrating a mouth member formed of a preliminarily heated synthetic resin and a bag unit formed of a flexible film, the method comprising a preliminary heating step of softening the synthetic resin of the mouth member at the part to be melt-bonded to the bag unit, melt-bonding part of mouth member, while preventing the synthetic resin of the mouth member at the end part in the bag side, end part of mouth member, from being softened at the preliminary heating step, and a step of inserting the preliminarily heated mouth member into the opening of the bag unit and pressing them by a sealing mold to melt-bond the melt-bonding part of the mouth member to the opening; and a medical container produced by the bag-making method.

7 Claims, 4 Drawing Sheets

BAG-MAKING METHOD

CROSS-REFERENCE TO RELATED APPLICATIONS

This application claims the benefit of U.S. Provisional Application No. 60/479,837, filed Jun. 20, 2003, and Japanese Patent Application No. 2002-314252, filed Oct. 29, 2002.

BACKGROUND OF THE INVENTION

1. Field of the Invention

The present invention relates to a bag-making method, more specifically, the present invention relates to a bag-making method of producing a bag by melt-bonding a mouth member formed of a synthetic resin and a bag unit formed of a flexible film to ensure excellent liquid tightness at the melt-bonded part between the mouth member and the bag unit. Furthermore, the present invention relates to a medical container used after filling a transfusion solution or blood in the container produced by the above-described bag-making method.

Priority is claimed on Japanese Patent Application No. 2002-314252, filed Oct. 29, 2002.

2. Description of Related Art

In recent years, a medical container formed by using a synthetic resin is often used in place of a glass-made medical container. The synthetic resin-made medical container includes a container produced by blow molding and a container produced from a film or a sheet (hereinafter, a film and a sheet are collectively called a "film") obtained by inflation molding or T-die casting. Among these, a container produced from a film (hereinafter referred to as a "film bag") is increasing, because the film bag is thin and uniform in the container thickness and can be reduced in the volume after use, the waste is therefore less generated and at the transfusion, the discharging rate of liquid content can be kept almost constant until the last. In the film bag, a mouth member which is a hollow cylindrical body formed of a synthetic resin and having a three-dimensional shape as shown in FIG. 1 is fixed by heat sealing so as to enable filling or discharging of the content. The mouth member has a hollow circular or elliptic cross-section in many cases.

In the fixing of the mouth member to the film, a three-dimensionally shaped member must be fixed to a two-dimensional planar film and as shown in FIG. 2, a gap 22 is sometimes generated between the A-frame part of the film and the melt-bonding part of the mouth member (hereinafter referred to as a "A-frame part gap") to cause leakage of the liquid content. Particularly, in the case of a thick film having a film thickness of 100 μm or more, the film is deformed in agreement with the shape of the mouth member at the heat sealing, though this may vary depending on the shape of the mouth member, and the once sealed portion is sometimes separated due to restoring stress of the film. Furthermore, on melt-bonding the mouth member and the film by sandwiching these with a sealing mold, the film is subject to an excess tensile stress so as to agree with the shape of the mouth member and this bears a risk of thinning the film or forming a hole in the film.

For preventing such deformation or hole formation of film, a method of stacking a heat-resistant layer on the film by using an adhesive to obtain a laminate film enhanced in the heat resistance is known. However, use of an adhesive is not preferred in the medical field because the adhesive sometimes dissolves out. Accordingly, various studies have been made for the bonding technique of causing no dissolving out of a material and enabling liquid-tight bonding without generation of a gap between a mouth member and a bag unit comprising a single-layer or multilayer film.

As the container succeeded in solving the problem of the A-frame part gap, a container obtained by bonding a bag unit and a mouth member provided with, as shown in FIG. 3, a thin strip 23 outwardly extending in the left and right sides of the melt-bonding part has been proposed.

Specific examples of the method for producing a container by bonding a container body and a mouth member provided with a thin strip outwardly extending in the left and right sides of the melt-bonding part include: a method of producing a mouth member having previously provided thereon thin strips by using a preheating jig and then heat-sealing it to a transfusion bag (see, Patent Document 1);

a method of melting the surface of an opening plug at a temperature higher by 15 to 80° C. than the melting point of the material for the opening plug before the opening plug comes into contact with a film or a sheet, simultaneously forming a fuse-bonding tab in the width of 0.2 to 3 mm on both sides of the opening plug, and pressing two sheets of film or sheet to the opening plug from the symmetrical directions to fuse-bond the films or sheets to the opening plug (see, Patent Document 2);

a method of providing a protruding part on the outer circumferential face of a hollow cylindrical body at symmetrical positions dividing the hollow cylindrical body into two in the perpendicular axial direction, with the joining part to the hollow cylindrical body being narrowed, heating and softening the protruding parts and then abutting a sheet to the protruding parts and hollow cylindrical body in the softened state (see, Patent Document 3);

a method of heat-sealing an inflation tube to a mouth part having fin-like protrusions formed by a metal mold and thereby producing a bag (see, Patent Document 4); and a method of, before melt-bonding an opening plug to a film or a sheet, heating the surface layer at the melt-bonding part of the opening plug in the temperature range from the softening temperature of the material for the melt-bonding part of the opening plug to a temperature 13° C. higher than the melting point by utilizing radiation heat of a heater at a temperature of 600 to 800° C., pressing the heated opening plug from both sides by fin-forming metal molds symmetrical with respect to the opening plug to form fin-like thin strips on the opening plug, inserting the opening plug still in the heated state between films or sheets, and melt-bonding the opening plug to the films or sheets by a heat-sealing mold (see, Patent Document 5).

These are a method of producing a mouth member having previously provided thereon a thin strip outwardly extending in the left and right sides of the mouth member at the part to be melt-bonded to a film, and then bonding the mouth member to a bag unit. Such a method not only requires an excess step for forming a thin strip but also encounters problems at the formation of the thin strip, such as fluctuation in the size of thin strip, unevenness in the size between left and right thin strips and attachment of carbide debris from the thin strip-forming mold. In addition, the previously formed thin strip may be deformed, for example, may be shrunk, distorted or fallen down. Furthermore, the heating is readily accompanied with deformation of the mouth member due to release of a residual stress in the melt-bonding part generated at the injection molding of the mouth member, as a result, the positions of the mouth member, bag unit and sealing mold cannot be exactly adjusted at the bonding of the mouth member to the bag unit, resulting in unsatisfactory bonding. Accordingly, improvements for more completely preventing the generation of a A-frame part gap are being demanded.

Particularly, in the case of a large size mouth member with a diameter exceeding 10 mm, thinning of film and generation of pinhole are liable to more often occur.

Patent Document 1
JP-UM-A-61-194638 (the term "JP-UM-A" as used herein means an "unexamined Japanese published utility model application")

Patent Document 2
Japanese Patent No. 2,940,987

Patent Document 3
Japanese Patent No. 2,791,387

Patent Document 4
JP-A-4-191033 (the term "JP-A" as used herein means an "unexamined Japanese patent application")

Patent Document 5
Japanese Patent No. 3,048,486

Patent Document 6
JP-B-3-5304 (the term "JP-B" as used herein means an "examined Japanese patent publication")

SUMMARY OF THE INVENTION

The present invention has been made under these circumstances and a main object of the present invention is to provide a bag-making method for obtaining a bag with a mouth member, having excellent liquid tightness at the melt-bonded part between the mouth member and the bag unit, where the mouth member is reduced as much as possible in the deformation of the melt-bonding part at the preheating, the number of steps is small, and the generation of the A-frame part gap can be stably prevented.

As a result of extensive investigations on the bag-making method of producing a bag by melt-bonding a mouth member and a bag unit and capable of preventing the generation of A-frame part gap, the present inventors have found that the mouth member produced by injection molding has a residual stress generated at the injection molding, this residual stress is released by the heating at the formation of thin strips on the mouth member or at the preliminary heating, thereby causing deformation, and this deformation makes it difficult to exactly determine relative positions of the mouth member, bag unit and sealing mold and gives rise to generation of harmful local contact or gap between the sealing mold and the bag unit, as a result, uniform and stable sealing can be hardly attained. Accordingly, it has been found that by suppressing the deformation of the mouth member, a uniform thin strip can be stably formed, the generation of A-frame part gap can be prevented and at the same time, the bag unit in the vicinity of the mouth member can be prevented from thinning of film due to heating at the end part of the mouth member. The present invention has been accomplished based on this finding.

More specifically, the present invention relate to a bag-making method described in 1) to 7) below.

That is, the above-described object can be attained by developing:

1) a bag-making method for producing a bag by melt-bonding and thereby integrating a mouth member formed of a preliminarily heated synthetic resin and a bag unit formed of a flexible film, the method comprising a preliminary heating step of softening the synthetic resin of the mouth member at the part melt-bonded to the bag unit, which is a melt-bonding part of mouth member while preventing the synthetic resin of the mouth member at the end part in the bag side, which is an end part of mouth member from being softened at the preliminary heating, and a melt-bonding step of inserting the preliminarily heated mouth member into the opening of the bag unit and pressing them by a sealing mold to melt-bond the melt-bonding part of the mouth member to the opening;

2) the bag-making method as described in 1) above, wherein radiation heat is used for the preliminary heating;

3) the bag-making method as described in 1) above, wherein the end part of the mouth member has a length of 0.5 mm or more;

4) the bag-making method as described in 1) above, wherein the end part of the mouth member is prevented by heat insulating means from being heated at the preliminary heating;

5) the bag-making method as described in 1) above, wherein in the melt-bonding step, the melt-bonding is performed not to heat the mouth member in the region at least 0.5 mm from the lowermost portion of the end part;

6) the bag-making method as described in 1) above, wherein a mouth member supported by a cylindrical body is inserted into the opening of a bag unit and the mouth member and the bag unit are melt-bonded while the bag unit is depressurized; and 7) a medical container produced by the bag-making method described in of 1) above.

According to the bag-making method, the number of steps is small and generation of a gap in the A-frame part can be stably prevented, so that the bag with a mouth member can be prevented from liquid leakage. Furthermore, the film forming the bag unit can be prevented from thinning at the distal end of the mouth member due to heating and therefore, the bag can be used in the field of medical container and the like. Thus, the present invention is useful.

DETAILED DESCRIPTION OF THE INVENTION

Figure 1:
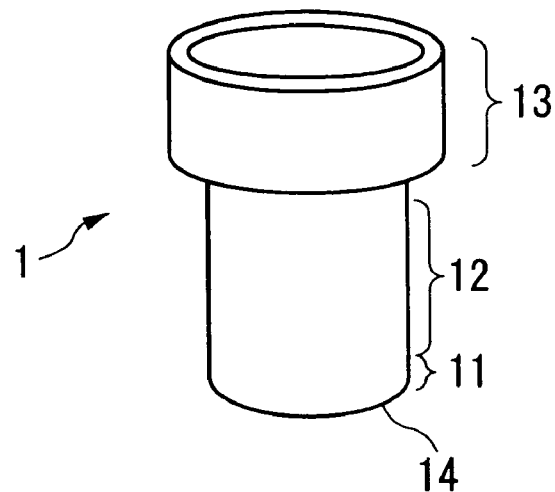
FIG. 1 is a perspective view showing one example of the mouth member.
Figure 2:
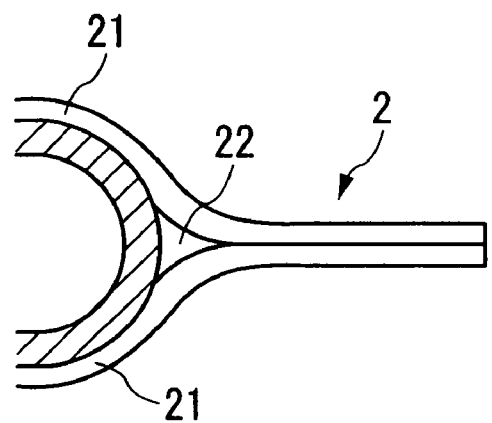
FIG. 2 is a cross-sectional view of the A-frame part having a gap.
Figure 3:
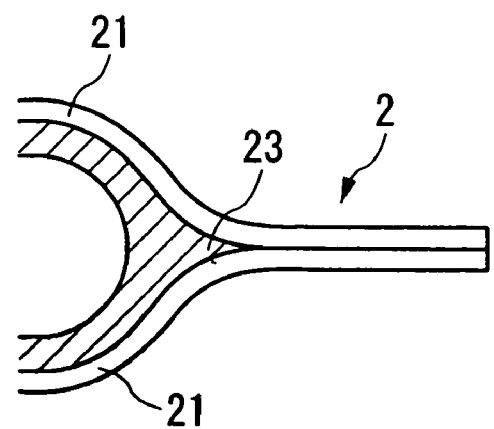
FIG. 3 is a cross-sectional view of the A-frame part in the case of using a mouth member where a thin strip is provided and extended.

The present invention is described in detail below by referring to the drawings.

The mouth member 1 works out to an injection inlet/outlet of a bag and the cross-section thereof has a hollow circular, elliptic, rhombic or boat form. Also, one mouth member may have a plurality of injection inlets/outlets.

In the case where the mouth member 1 has a circular cross-section, the diameter is from 10 to 30 mm, the thickness of the mouth member is from 0.5 to 3 mm and the height is approximately from 20 to 80 mm.

Examples of the synthetic resin used for the mouth member include polyester resins such as polyethylene terephthalate and polybutylene terephthalate, polycarbonate resins, and polyolefin-base resins such as polypropylene and polyethylene. Among these, preferred are polyolefin-base resins, more preferred is a single resin or a blended resin of polyethylene-base resins such as high-density polyethylene, linear low-density polyethylene, high-pressure process low-density polyethylene and polyethylene produced by using a metallocene catalyst. The same resin as the flexible film constituting the bag unit is preferably used.

The mouth member 1 may comprise multiple layers. In particular, it is preferred that the same resin as the flexible film is used for the outermost layer of the mouth member and a resin higher in the heat resistance and rigidity than the outer layer is used for the innermost layer, because the mouth member is more suppressed from the deformation at the preliminary heating and at the same time, when an injection needle is erroneously pieced inside the mouth member, the needle is prevented from piercing from the inside to the outside on the side surface of the mouth member.

The bag unit 2 comprises a flexible film and examples of the construction material thereof include polyolefin resins such as polypropylene and polyethylene, polyamide resins and polyester resins. A construction material having a melting point approximated to that of the melt-bonding face 12 of the mouth member 1 or a polyolefin-base resin obtained by blending such resins is preferred. The flexible film may have either a single-layer structure or a multilayer structure and the thickness thereof is approximately from 100 to 400 μm. In the case of a multilayer laminate film, a construction material of the same resin as and approximated in the melting point to the melt-bonding face of the mouth member or a resin obtained by blending such materials is preferably used for the inner surface of the bag unit. For the flexible film, a cylindrical film produced by inflation molding or a bag material obtained by folding a film produced by T-die casting or the like or superposing the films is used.

In the bag-making method of the present invention, the melt-bonding is performed after the mouth member 1 formed of a synthetic resin is preliminarily heated. The mouth member 1 is produced by injection molding in almost all cases and the present inventors have found that the residual stress generated at the injection molding and confined in the mouth member is released at the preliminary heating to deform the mouth member and therefore, when the deformed mouth member 1 is pressed together with the bag unit 2 by a sealing mold 5, the contact with the film of the bag unit 2 becomes non-uniform, as a result, local contact or gap is generated between the mouth member 1 and the film of the bag unit 2 before the melt-bonding. More specifically, the relative positional relationship among the mouth member 1, bag unit 2 and sealing mold 5 changes due to the deformation of the mouth member and the A-frame part gap cannot be filled with the mouth member resin in some cases. For constantly establishing a preferred refative positional relationship among the mouth member 1, bag unit 2 and sealing mold 5, the mouth member 1 should be prevented from deforming at the preliminary heating. The present inventors have found that the deformation can be prevented by performing the preliminary heating without softening the end part 11 of the mouth member, as a result, the mouth member 1, bag unit 2 and sealing mold 5 can be adjusted to respective exact positions and the bag unit 2 and mouth member 1 can be melt-bonded without generating an A-frame part gap.

Conventionally, the mouth member 1 and the bag unit 2 have been melt-bonded by defining the melt-bonding part of the mouth member to the portion of the mouth member excluding the upper part 13 of the mouth member, to which a rubber plug is fixed, and heating the mouth member until the melt-bonding part is softened. However, in order to suppress the deformation of the mouth member 1, when the end part 11 in the bag side of the mouth member, which is an end part of mouth member as well as the upper part 13 of the mouth member are not heated and thereby not softened, the mouth member as a whole is prevented from deforming, the positional precision of the mouth member, bag unit and sealing mold is enhanced, the contact property is improved, uniform melt-bonding and formation of thin strips at the melt-bonding part of the mouth member are realized and melt-bonding free of a gap in the A-frame part between the bag unit and the mouth member can be achieved. According to conventional methods, the end part of the mouth member is also heated and depending on the case, heated to a temperature higher than the melting point of film, as a result, thinning of film is readily generated in the vicinity of the end part of the mouth member at the sealing of the mouth member 1 and the bag unit 2. This problem can also be solved by the above-described technique. The partial thinning of film is prevented and therefore, the bag falling strength of the container body is improved.

The "softening" as used herein means a state where the resin is softened to such a degree that the surface of the melt-bonding part of the mouth member pressed by a sealing mold through a film is melt-bonded to the film and at the same time, a thin strip is formed. The non-softened end part of the mouth member is confirmed with an eye to have the same surface state as the surface of the mouth member before the preliminary heating. In this case, a clear boundary line is observed at the boundary between the end part of the mouth part and the melt-bonding part of the mouth member before the pressing by a sealing mold. By preliminarily heating the mouth member to provide a state that this boundary line is observed with an eye, the object of the present invention can be achieved.

In the preliminary heating, direct heating by using a hot mold or heating by radiation heat from a heat source such as annular heater or far infrared ray is employed and the surface temperature of the melt-bonding part 12 of the mouth member to the bag unit, which is a melt-bonding part of mouth member is set to a temperature where the synthetic resin used for the mouth member is softened.

Figure 4A:
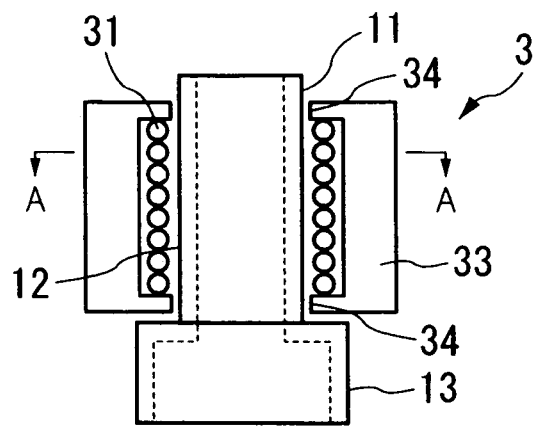
FIG. 4A is a cross-sectional view showing the state where the melt-bonding part of the mouth member is preliminarily heated by an annular heater.
Figure 4B:
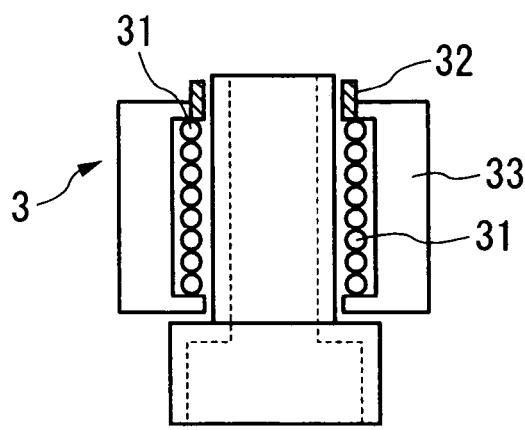
FIG. 4B is a cross-sectional view showing the state where a heat insulating plate is provided and the melt-bonding part of the mouth member is preliminarily heated by an annular heater.
Figure 4C:
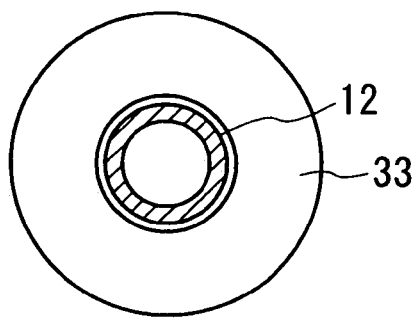
FIG. 4C is a cross-sectional view cut along A-A in the cross-sectional view of FIG. 4A.

Among these heating methods, heating by radiation heat is advantageous in view of attachment of foreign matters and simplification of the machine structure and therefore, this method is preferred. For the preheater 3, an annular heater having a shape of not heating the end part 11 of the mouth member is preferably used. FIGS. 4A and 4B each is a cross-sectional view showing one example of the mouth member during preliminary heating with an annular heater 31 covered by 33 heat insulating material. The clearance between the mouth member 1 and the preheater 3 can also be maintained to a higher precision by fitting the mouth member 1 at the non-heating part 34 of the annular heater or fitting a support into the hollow part of the mouth member 1 from the upper portion of FIGS. 4A and B, thereby supporting the mouth member at least at two portions to keep the exact spatial arrangement of the mouth member 1 and the annular heater. Furthermore, when the mouth member is rotated, the quantity of heat received from the preheater 3 can be made uniform over the entire circumference of the melt-bonding part 12 of the mouth member. When the quantity of heat applied to the melt-bonding part 12 of the mouth member at the preliminary heating step is stabilized and homogenized, the deformation of the mouth member 1 is more suppressed and the positional adjustment of the mouth body, bag unit and sealing mold can be more exactly performed.

The heating temperature must be a temperature sufficiently high to form a thin strip on the mouth member at the time of pressing the mouth member through a film in the melt-bonding step. In the case of heating by radiation heat, the heating temperature can be appropriately selected according to the clearance between the heat source and the mouth member surface, or the construction material of the mouth member, but the heating is preferably performed for 8 to 13 seconds by setting the heat source at a temperature of 500 to 750° C., though this may vary depending on the construction material of the mouth member. If the temperature of the melt-bonding part 12 of the mouth member is too high, a degraded product of synthetic resin may be generated or flow deformation may occur and furthermore, the end part of the mouth member may be softened due to the effect of the temperature at the melt-bonding part of the mouth member, therefore, this must be avoided.

To speak specifically, in order to not soften the end part 11 of the mouth member and soften the melt-bonding part 12 of the mouth member, the end part 11 of the mouth member is, for example, protruded by at least 0.5 mm or more, preferably 0.8 mm or more, than the heat source such as annular heater, whereby the end part 11 of the mouth member can effectively avoid being affected by the radiation heat and softened, as a result, the mouth member as a whole can be prevented from reduction in the rigidity and deformation due to heat.

Figure 5A:
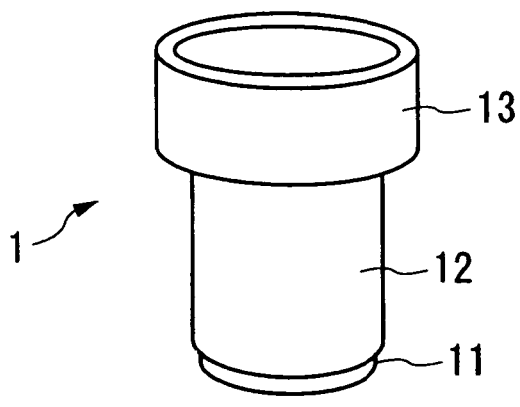
FIG. 5A is a perspective view showing another example of the mouth member.
Figure 5B:
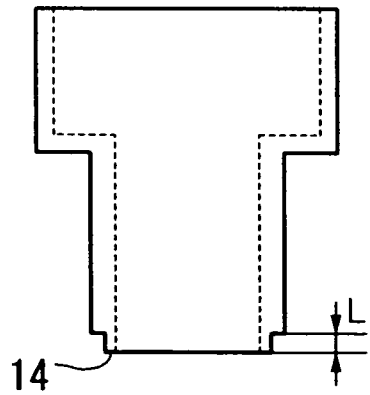
FIG. 5B is a cross-sectional view of the another example of the mouth member.

Other examples include, as shown in FIG. 4B, a method of using heat insulating means such as heat insulating plate 32 for preventing the end part 11 of the mouth member from being subjected to radiation heat from a heat source and, although not shown, a method of cooling the end part of the mouth member by abutting thereto a cooling mold having a circular cap-like recessed portion into which the end part of the mouth member is entered. Furthermore, the object of the present invention can also be achieved, as shown in FIGS. 5A and 5B, by using a mouth member where the diameter is reduced at the end part 11 of the mouth member in the region in a length L of 5 mm or less, preferably from 1 to 5 mm, from the lowermost portion 14 of the mouth member so as to enlarge the distance of the end part 11 of the mouth member from the heat source as compared with the melt-bonding part 12 of the mouth member.

The melt-bonding step of pressing and thereby melt-bonding the mouth member and the bag unit is a step of inserting the preliminarily heated mouth member into the opening of the bag unit and pressing them by a sealing mold to melt-bond the melt-bonding part of the mouth member to the opening. An example of the melt-bonding step is described below by referring to FIG. 6. In the following example, a mouth member supported by a cylindrical body is inserted into the opening of a bag unit and the bag unit is depressurized and is melt-bonded to the mouth member. The method by depressurization is more effective in the case where the diameter of the mouth member exceeds 10 mm. An analogous method is described in Patent Document 6.

Figure 6:
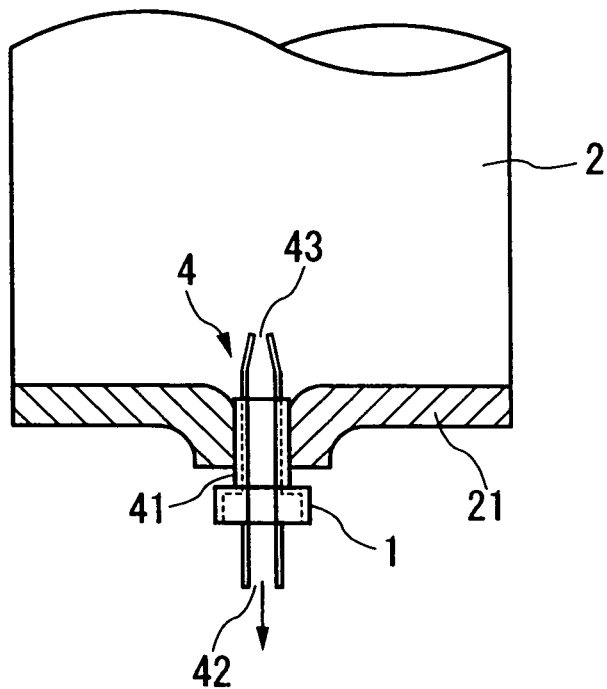
FIG. 6 is a cross-sectional view showing the state where the mouth member and the bag unit are depressurized.

For facilitating the holding of the mouth member, as shown in FIG. 6, a cylindrical body 4 is inserted into the hollow part of a hollow cylindrical mouth member 1.

The cylindrical body has an outer diameter slightly smaller than the inner diameter of the mouth member and in the inside thereof, a hole is penetrated to the distal end. The distal end (air suction inlet 43) of the cylindrical body is formed to give a shape conforming to the bent film, that is, a shape where the sectional area gradually decreases toward the distal end of the cylindrical body.

The sectional area starts gradually decreasing at the position 5 mm or more from the distal end of the cylindrical body and at the same time, closer to the distal end than the end part 11 of the mouth member. The cylindrical body is inserted such that the distal end 43 of the cylindrical body protrudes at least 5 mm or more from the end part 11 of the mouth member. The inside of the bag unit is depressurized by suctioning air therein, which is described later, and thereby the cylindrical body 4 and the bag is more tightly contacted. Furthermore, if the cylindrical body 4 is served also as a fixing jig for the mouth member 1 in the preliminary heating step, this may provide an effect of more preventing the deformation of the mouth member, however, since the machine structure is complicated, that is, the machine structure needs to be constituted by taking account of the difference between the sealing time (time period where the sealing mold is pressed) and the preliminary heating time, the equipment is slightly complicated and this gives rise to increase in the cost.

If desired, the inside of the bag unit is depressurized by suctioning air by the depressurization port 42 therein to enhance the tight contact between the cylindrical body 4 and the bag 2. The timing of depressurization is before the sealing mold 5 is secured or simultaneously with the closing of the sealing mold 5. The bag unit is fixed by the depressurization and therefore, troubles such as thinning of film or generation of pinhole at the boundary between the melt-bonding part and the non-melt-bonding part due to the effect of heat from the sealing mold 5 can be very efficiently prevented from occurring. Furthermore, the bag unit 2 and the mouth member 1 are strongly contacted by the depressurization and therefore at the cylindrical support part 41, the film is bentand fixed in agreement with the shape of the end part 11 of the mouth member. In addition, due to the low temperature at the end part of the mouth member, the thinning is inhibited with good efficiency.

Figure 7A:
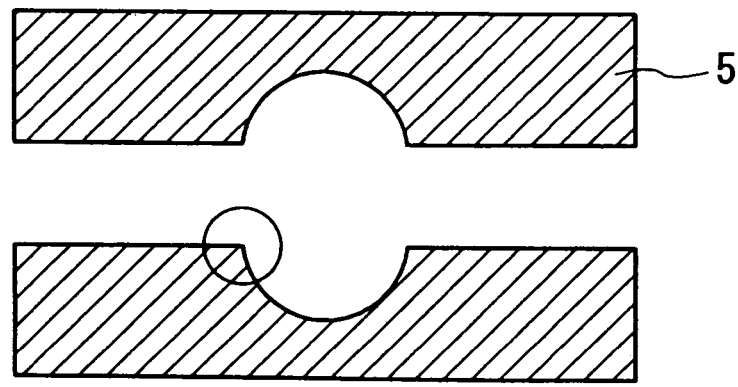
FIG. 7A is a horizontal cross-sectional view of a sealing mold.
Figure 7B:
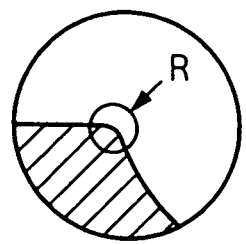
FIG. 7B is a partially enlarged view of FIG. 7A.

The bag unit 2 and the mouth member 1 are pressed by a sealing mold 5 shown in FIG. 7 to melt-bond the melt-bonding part 12 of the mouth member and the melt-bonding part 21 of the bag unit. The temperature of the sealing mold 5 is higher by 10° C. or more than the melting point of film (bag unit resin) and in the case of a film formed of a polyethylene resin, this temperature is from 110 to 170° C. and the melt-bonding time is approximately from 1 to 3 seconds. The time period after the preliminary heating until the pressing by the sealing mold 5 is preferably as short as possible, but due to the limitation by the production apparatus, this time period is usually on the order of 1 to 4 seconds. If this time period exceeds 4 seconds, the surface temperature at the melt-bonding part of the mouth member decreases and the sealing strength between the mouth member 1 and the bag unit 2 is liable to be insufficient. At the melt-bonding, when the corner of the mold has a small R as shown in FIG. 7B, a thin strip can be easily formed.

Figure 8:
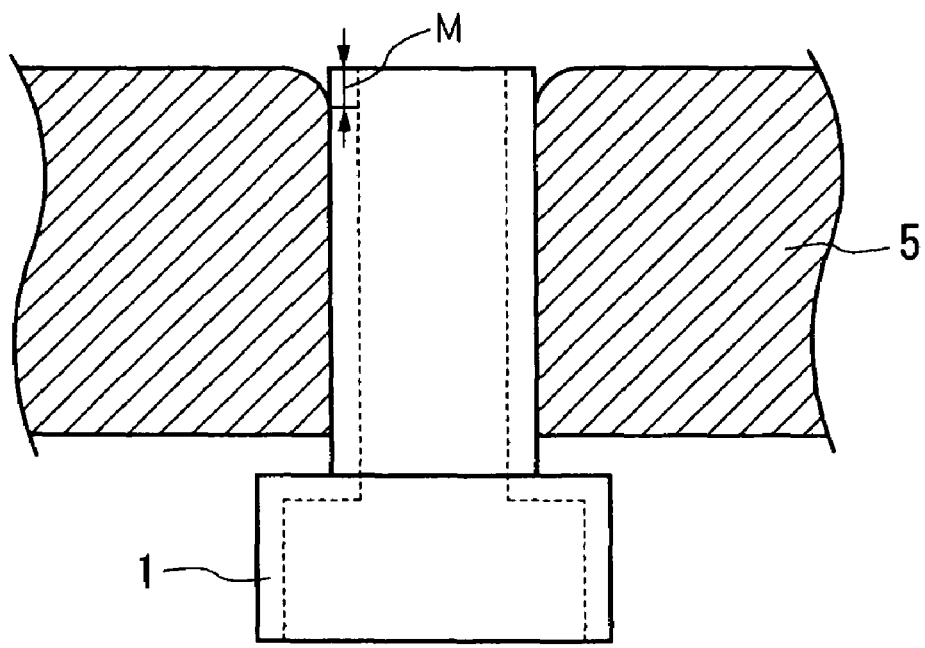
FIG. 8 is a longitudinal cross-sectional view of a sealing mold.
Figure 9:
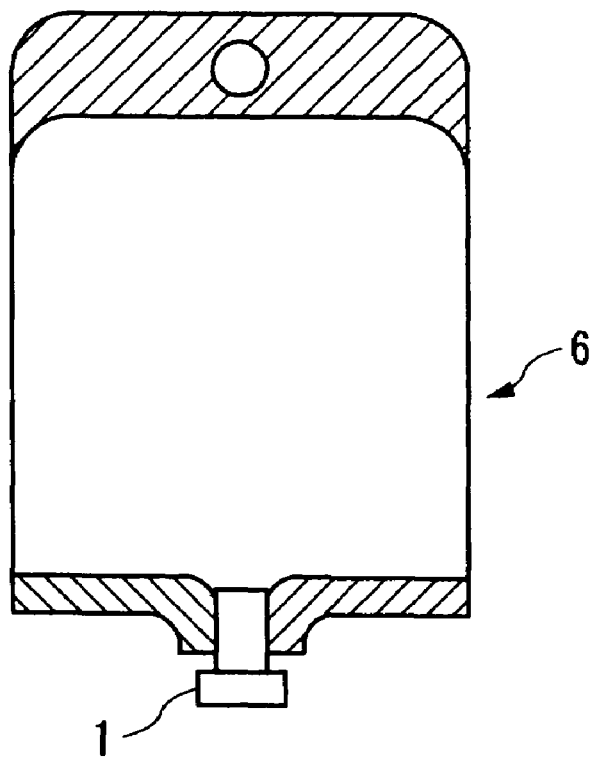
FIG. 9 is a medical container by the bag-making method.

The sealing mold 5 has a shape comprising a semicircular cross-section and a flat part and R is formed at the connection part of the semicircular cross-section and the flat part, that is, at the A-frame part between the mouth member 1 and the film. R is from 0.2 to 2 mm, preferably from 0.3 to 1.7 mm. If R is too large, formation of the A-frame part gap cannot be prevented, whereas if it is too small, troubles are readily generated, for example, the film is scratched or an insufficient thin strip is formed. The diameter of the semicircular cross-section is slightly smaller than the size obtained by adding the film thickness to the diameter of the melt-bonding part 12 of the mouth member. Also, the sealing mold 5 is preferably designed to perform the melt-bonding without heating the region at least 0.5 mm from the lowermost portion of the end part of the mouth member so that thinning of the film can be avoided. Examples of such a sealing mold 5 include a mold having a shape such that the region in a length of at least 0.5 mm from the lowermost side of the end part of the mouth member is controlled to a temperature lower than the melting point of the film. A preferred sealing mold is a mold of, as shown in FIG. 8, allowing the mouth member 1 to protrude by a length of M from the sealing mold 5. The length M is preferably 0.5 mm or more. With this length, the film is not pressed between the distal end of the mouth member and the mold and thinning of the film is hard to occur. In this time, this film may be the part of a medical container 6 shown in FIG. 9.

In this example, the mouth member and the bag unit are melt-bonded while the bag unit is depressurized, however, the effect of the present invention can also be achieved by softening the melt-bonding part 1 of the mouth part, where the mouth member 1 and the bag unit 2 are melt-bonded, while preventing the end part 11 of the mouth member from being softened at the preliminary heating, and pressing the mouth member 1 and the bag unit 2 without using a cylindrical body.

In the mouth member 1 heated at the preliminary heating step of the present invention, the residual stress generated at the injection molding is eliminated and the deformation is prevented, as a result, the mouth member 1 and the bag unit 2 each can be fitted to the exact position with respect to the sealing mold 5. Since these are melt-bonded in such an exactly positioned state, the softened resin in the melt-bonding part 12 of the mouth member pressed to the flexible film forms a thin strip having a stable shape and extending in the A-frame part gap.

The thin strip suitably has a size such that the thickness is approximately from 50 to 200 μm and the length is approximately from 0.1 to 2 mm. According to the present invention, the mouth member comes to have a thin strip of this size and by melt-bonding the mouth member, a bag with a mouth member free from formation of A-frame part gap and generation of liquid leakage can be stably produced.

After the mouth member is melt-bonded, the melt-bonding part is sandwiched by a cooling mold. Since the deformation of the mouth member at the preliminary heating is prevented, similarly to the sandwiching by a sealing mold, the material to be sandwiched can be exactly and stably positioned also at the sandwiching by a cooling mold and therefore, a thin strip is stably molded.

In the case where the inside of the bag unit has been depressurized, the depressurization is released. By performing the melt-bonding and cooling in the depressurized state, the film is tightly contacted and fixed in agreement with the shape of nozzle until the film is melt-bonded with the mouth member by a film sealing mold and cooled. The melt-bonding is performed as such in the state where the film is inhibited from free movement, and this provides an effect that the melted and softened film is not stretched and the film is not thinned at the boundary of the melt-bonding part and the non-melt-bonding part of the mouth member.

EXAMPLES

A mouth member formed of an equivalent blend composition of high-density polyethylene and linear low-density polyethylene and having a circular cross-sectional shape was produced by injection molding, where the diameter was 17 mm, the inner diameter was 13 mm and the thickness at the melt-bonding part and the end part of the mouth member was 2 mm.

A tubular linear low-density polyethylene film having a width of 140 mm was formed by inflation molding and cut into a length of 300 mm. One cut part was closed by heat sealing and another cut part was used as the melt-bonding part of the opening. On the other hand, an annular heater designed such that the surface temperature at the radiation part becomes 700° C. and the end part of the mouth member protrudes by 1 mm from the radiation part was inserted into the mouth member while aligning the center with the center of the mouth member and heated for 10 seconds. After a hollow cylindrical body was fit into the mouth member, the mouth member was swiftly inserted into the melt-boning part of the bag unit prepared above and simultaneously with suctioning by a vacuum pump to depressurize the inside of the bag unit, the melt-bonding part was sandwiched by a sealing mold set at 140° C. for 2 seconds. Subsequently, the melt-bonding part was sandwiched by a cooling mold for 3 seconds and after the vacuum was relieved, the hollow cylindrical body was pulled out to produce a bag with a mouth member.

100 Units of this bag with a mouth member were prepared and after filling 500 mL of water into each bag and tightly plugging it, the bag was externally pressed to give an internal pressure of 0.07 MPa and then left standing for 5 minutes. In all bags with a mouth member, water leakage was not observed.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

The invention claimed is:

1. A bag-making method for producing a bag by melt-bonding and thereby integrating a mouth member formed of a preliminarily heated synthetic resin and a bag unit formed of a flexible film, said method comprising;
   a preliminary heating step of softening the synthetic resin of the mouth member at the part to be melt-bonded to the bag unit, which is a melt-bonding part of mouth member, while preventing the synthetic resin of the mouth member at the end part in the bag side, which is an end part of mouth member, from being softened at the preliminary heating, and
   a melt-bonding step of inserting the preliminarily heated mouth member into the opening of the bag unit and pressing them by a sealing mold to melt-bond the melt-bonding part of the mouth member to the opening,
   wherein the temperature of the sealing mold is higher than a melting point of a bag unit resin by 10° C. or more, and time period after the preliminary heating step until the pressing by the sealing mold is 1 to 4 seconds.

2. The bag-making method as claimed in claim 1, wherein radiation heat is used for the preliminary heating.

3. The bag-making method as claimed in claim 1, wherein the end part of the mouth member has a length of 5 mm or less.

4. The bag-making method as claimed in claim 1, wherein the end part of the mouth member is prevented by heat insulating means from being heated at the preliminary heating.

5. The bag-making method as claimed in claim 1, wherein in the melt-bonding step, the melt-bonding is performed not to heat the mouth member in the region at least 0.5 mm from the lowermost portion of the end part.

6. The bag-making method as claimed in claim 1, wherein a mouth member supported by a cylindrical body is inserted into the opening of a bag unit and the mouth member and the bag unit are melt-bonded while the bag unit is depressurized.

7. A medical container produced by the bag-making method claimed in claim 1.

* * * * *